UNITED STATES PATENT OFFICE.

COLONEL E. BRIGHT, OF COLUMBUS, OHIO.

FOOD COMPOUND.

No. 900,701.

Specification of Letters Patent.

Patented Oct. 13, 1908.

Application filed November 18, 1905. Serial No. 288,003.

*To all whom it may concern:*

Be it known that I, COLONEL E. BRIGHT, a citizen of the United States, residing at Columbus, in the county of Franklin and State of Ohio, have invented certain new and useful Improvements in Food Compounds, of which the following is a specification.

This invention relates to edible compositions and especially to food compounds which, while adapted for general consumption, are intended more particularly for use as rations for troops, travelers, explorers, campers and the like, and consists of a food product somewhat similar to that described in my Patent No. 805,001 granted November 21, 1905 for food products.

The fat of beef possesses in a very high degree the properties of assuaging hunger without producing an abnormal thirst and of maintaining a proper body temperature but, by reason of the high percentage of stearin in beef fat it is, in its natural state almost impossible to digest in anything but very small amounts.

The indigestibility of beef fat in its natural state almost wholly precludes its use as a food, except in very small quantities and in the cases of certain toothsome desserts which are proverbially indigestible as for example, suet pudding and mince pie. This indigestibility of beef fat which prevents the use in food of a greater part of the fat of beef is a great source of loss to packers, it being estimated that an average of something over $5 a head is lost on every beef slaughtered as compared with what would be realized were such fat available for use as a wholesome food in its natural state.

It is the object and purpose of this invention to provide a food containing beef fat, in which the character of the beef fat is so modified that it is rendered readily digestible and assimilable without depriving the said fat of its conspicuous properties of assuaging hunger without creating an abnormal thirst and of maintaining a proper body temperature.

To this end the process of producing my improved food product consists, in its preferred embodiment, in adding to and combining with the beef fat, corn-meal, oat-meal, or like material containing a large proportion of starch and a fat containing little stearin and a very high percentage of olein.

The fat of beef contains normally over twenty-five per cent. of stearin, while the oil which forms from five to ten per cent. of corn or oat meal contains practically no stearin and a very high percentage of olein. A combination of the two fats so modifies the properties of each that a readily digestible and assimilable fat is produced therefrom.

In producing my food product in its preferred form, I grind or chop the beef fat. I then heat water, preferably containing a small quantity of salt, to the boiling point and add the comminuted fat thereto. When the fat is thoroughly heated I gradually add corn-meal, or other cereal used, stirring the several ingredients to effectively commingle them. I boil the ingredients above mentioned for preferably about thirty minutes during which time the beef fat will unite with the oil from the corn-meal, or other cereal, forming a fatty preparation which is readily digestible.

The proportions which I prefer to employ in the preparation of my improved food product are as follows:

| Ingredient | Amount | | | |
|---|---|---|---|---|
| Ground beef fat | 20 | parts | by | weight. |
| Corn-meal, or other similar cereal | 300 | " | " | " |
| Water | 100 | " | " | " |
| Common salt | 3 | " | " | " |

The proportions stated provide a fatty preparation in which the proportion of stearin constitutes approximately 13% of the fat therein.

By suitably regulating the time of boiling or the quantity of water employed, the food preparation may be given the form of either a soft or thick paste or the material may be boiled down until the product has a solid consistency.

The material is preferably placed in cans and hermetically sealed immediately after completing the boiling operation.

The use of the corn-meal, oat-meal or the like, in connection with the chopped beef fat, has the effect of producing a food compound which can be kept unaltered without the use of any antiseptic or other preserving agent.

The material is succulent and toothsome without further cooking or other treatment, but its taste is somewhat improved by frying it, the food itself requiring nothing to be added as the compound fat in the food takes the place of other fats ordinarily used in frying.

The material may be employed in numerous other ways, one of the most satisfactory of which is, as a basis for soup, tomatoes, onions, potatoes, and other vegetables commonly added to soup stock being employed in connection with my improved food preparation.

A food compound prepared in accordance with my improved process is particularly well adapted for use as rations by troops, travelers, explorers and the like, by reason of the following properties which it possesses: 1st, it contains, in a very high degree, the materials needed to nourish the body, maintain a proper body temperature and repair waste muscular and adipose tissue. 2nd, it is easily digested and capable of being readily absorbed and assimilated. 3rd, it is satisfying to the consumer so that small quantities will assuage hunger. 4th, it is of such a character as not to produce abnormal thirst. 5th, it nourishes, in a large measure, the entire body, so that no part, organ or function is weakened by its use. 6th, it is palatable to persons of widely different tastes. 7th, it can be eaten more or less continuously for a long time without cloying the consumer's appetite. 8th, it is capable of being prepared for consumption in various ways so that it may be served in widely diversified forms and given a variety of flavors.

While the proportions hereinbefore stated are those which I prefer to employ, it is to be understood that they may be modified somewhat without departing from the spirit of the invention or the scope of the appended claims.

While I have referred to the animal fat and specified cereal as being boiled, in my description of the preferred practice of my invention, it is to be understood that said fat and cereal may, instead of being boiled, be subjected to the recognized equivalent of the operation of boiling, such, for example, as steaming or prolonged heating in water which is heated, but not to the point of ebullition.

Having thus described my invention, what I claim and desire to secure by Letters Patent, is:

1. A food compound containing animal fat, and a cereal containing a fat comprising a high percentage of olein, the ingredients being present in such proportions that the stearin content of said product is reduced approximately 50% from the stearin in the uncompounded animal fat and said ingredients being boiled, substantially as described.

2. A food compound containing boiled animal fat and oat meal, the fat content of said food product containing between 10 and 15% of stearin.

In testimony whereof I affix my signature in presence of two witnesses.

COLONEL E. BRIGHT.

Witnesses:
C. H. WHIPPLE, Jr.,
FRANK G. CAMPBELL.